United States Patent
Cho et al.

(10) Patent No.: US 10,922,822 B2
(45) Date of Patent: Feb. 16, 2021

(54) IMAGE ANALYSIS METHOD FOR MOTION DETERMINATION, ELECTRONIC SYSTEM, AND NON-TRANSITORY COMPUTER-READABLE RECORDING MEDIUM

(71) Applicant: Wistron Corporation, New Taipei (TW)

(72) Inventors: Ching-An Cho, New Taipei (TW); Kuo-Ting Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 130 days.

(21) Appl. No.: 16/154,726

(22) Filed: Oct. 9, 2018

(65) Prior Publication Data
US 2019/0385314 A1  Dec. 19, 2019

(30) Foreign Application Priority Data
Jun. 15, 2018 (TW) .............................. 107120844 A (51) Int. Cl.
*G06K 9/00* (2006.01)
*G06T 7/246* (2017.01)

(52) U.S. Cl.
CPC .... *G06T 7/248* (2017.01); *G06T 2207/20024* (2013.01)

(58) Field of Classification Search
CPC ......... G06T 7/248; G06T 7/0002; G06T 7/13; G06T 7/254; G06T 7/70; G06T 7/11; G06T 5/30; G06T 2207/20024
See application file for complete search history.

(56) References Cited

U.S. PATENT DOCUMENTS

| | | | | |
|---|---|---|---|---|
| 6,983,420 B1* | 1/2006 | Itou | ...................... | G11B 27/034 |
| | | | | 715/723 |
| 7,864,982 B2* | 1/2011 | Lee | .................... | H04N 5/23264 |
| | | | | 382/107 |
| 8,994,805 B2 | 3/2015 | Ishii et al. | | |
| 9,810,785 B2* | 11/2017 | Grauer | .................. | G01S 7/4802 |
| 9,916,691 B2* | 3/2018 | Takano | .................. | A61B 6/461 |
| 9,936,142 B2* | 4/2018 | Hamada | ............... | H04N 5/2352 |
| 9,953,432 B2* | 4/2018 | Smith | ..................... | G06T 7/292 |
| 9,972,319 B2* | 5/2018 | Sendai | ................. | G02B 27/017 |
| 10,114,610 B2* | 10/2018 | Sendai | .................... | G06F 3/167 |
| 10,140,768 B2* | 11/2018 | Takahashi | ............ | G06T 19/006 |
| 10,169,925 B2* | 1/2019 | Takano | .................. | A61B 6/461 |
| 2005/0147170 A1* | 7/2005 | Zhang | .................. | H04N 19/503 |
| | | | | 375/240.16 |
| 2013/0182092 A1 | 7/2013 | Ishii et al. | | |
| 2019/0304080 A1* | 10/2019 | Liu | ......................... | G06T 7/254 |
| 2019/0385314 A1* | 12/2019 | Cho | ........................ | G06T 7/248 |

FOREIGN PATENT DOCUMENTS

CN  103118588  12/2014

* cited by examiner

*Primary Examiner* — Amir Alavi
(74) *Attorney, Agent, or Firm* — JCIPRNET (57) ABSTRACT

An image analysis method applicable to an electronic system is provided. The electronic system includes an image capture device. The image analysis method includes: obtaining a plurality of images captured by the image capture device; performing a motion detection on the plurality of images to determine whether the images include a motion; and determining whether a target enters the preset scenery or leaves the preset scenery in response to a determination that the plurality of images include the motion according to the motion detection.

19 Claims, 10 Drawing Sheets

IMAGE ANALYSIS METHOD FOR MOTION DETERMINATION, ELECTRONIC SYSTEM, AND NON-TRANSITORY COMPUTER-READABLE RECORDING MEDIUM

CROSS-REFERENCE TO RELATED APPLICATION

This application claims the priority benefit of Taiwan application serial no. 107120844, filed on Jun. 15, 2018. The entirety of the above-mentioned patent application is hereby incorporated by reference herein and made a part of this specification.

BACKGROUND OF THE INVENTION

Field of the Invention

The invention relates to an image analysis method, an electronic system, and a non-transitory computer-readable recording medium.

Description of Related Art

In recent years, the rate of population aging has been growing rapidly. In a busy city, children are not always able to take care of elders in close proximity. Therefore, home care is becoming more and more important, and home care institutions or care dispatch centers are also becoming ubiquitous.

Even in institutions for elderly care or patient care, caregivers cannot take care of all of the elders or patients one-on-one. Therefore, these institutions often dispose monitoring systems such as a plurality of cameras in an indoor environment to monitor elderly people or patients. However, the current monitoring system does not have the function of image recognition, and caregivers still need to always monitor a plurality of image screens corresponding to a plurality of cameras to learn, for instance, the current state or location of the elderly or patient. Accordingly, an automated auxiliary system meeting cost considerations can be regarded to be a demand of the current era.

SUMMARY OF THE INVENTION

Accordingly, the invention provides an image analysis method, an electronic system, and a non-transitory computer readable media that can automatically determine whether a target enters or leaves a preset scenery and are reliable and low-cost.

An embodiment of the invention provides an image analysis method applicable to an electronic system including an image capture device. The image analysis method includes the following. A plurality of images captured by an image capture device are obtained. A motion detection is performed on the plurality of images to determine whether the images include a motion. Whether a target enters a preset scenery or leaves the preset scenery is determined in response to a determination that the plurality of images include the motion according to the motion detection.

From another perspective, an embodiment of the invention provides an electronic system including an image capture device and a processor. The processor is coupled to the image capture device and configured to: obtain a plurality of images captured by the image capture device; perform a motion detection on the plurality of images to determine whether the images include a motion; and determine whether the target enters a preset scenery or leaves the preset scenery in response to a determination that the plurality of images include the motion according to the motion detection.

From another perspective, an embodiment of the invention provides a non-transitory computer-readable recording medium storing a code, wherein an image analysis method can be completed when the code is loaded into a computer and executed. The image analysis method includes the following. A plurality of images are obtained from an image capture device. A motion detection is performed on the plurality of images to determine whether the images include a motion. Whether a target enters a preset scenery or leaves the preset scenery is determined in response to a determination that the plurality of images include the motion according to the motion detection.

Based on the above, in the image analysis method, the electronic system, and the non-transitory computer readable recording medium provided in an embodiment of the invention, a motion detection requiring less computation is first performed on images captured by the image capture device, and only after a motion is confirmed in the images is an analysis requiring more computation performed on the image to determine whether a specific region of the image includes a target and determine whether the target enters the preset scenery or leaves the preset scenery. Accordingly, computing load can be significantly reduced and reliable and low-cost image analysis method and tool are provided.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

An embodiment of the invention introduces an image analysis method determining whether a target enters or leaves a preset scenery from a plurality of images captured by an image capture device disposed in correspondence to the preset scenery. In particular, regardless of whether the target enters or leaves the preset scenery, a process of entering or leaving is included, and therefore in an embodiment of the invention, a motion detection is first performed on a plurality of images, and only after a motion is detected is an image analysis performed to determine whether the target enters or leaves the preset scenery. Since the computation required for the motion detection is significantly less than the computation required for the image analysis to determine whether the target enters or leaves the preset scenery, the method provided in an embodiment of the invention can significantly reduce the computing load of the system.

Figure 1:
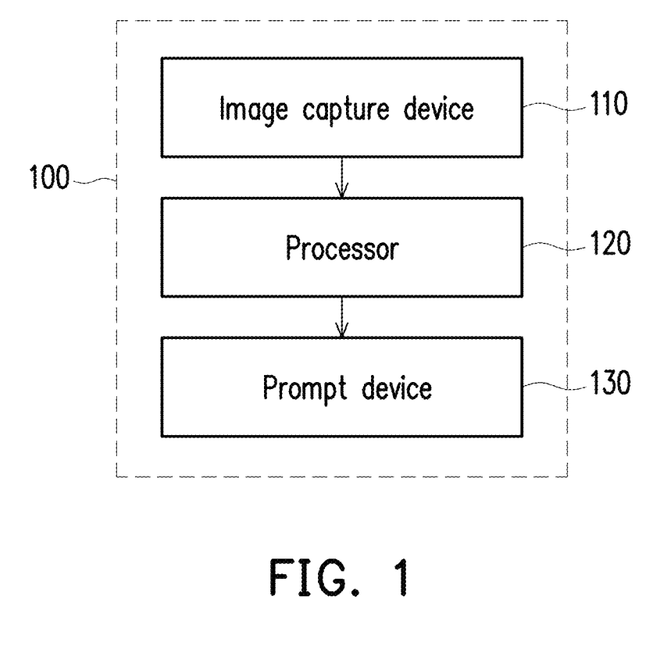
FIG. 1 shows a block diagram of an electronic system of an embodiment of the invention.

FIG. 1 shows a block diagram of an electronic system of an embodiment of the invention. Referring to FIG. 1, an electronic system 100 includes an image capture device 110, a processor 120, and a prompt device 130 and is configured to execute the image analysis method introduced in an embodiment of the invention to determine whether a target enters or leaves a preset scenery, wherein the processor 120 is coupled to the image capture device 110 and the prompt device 130. In some embodiments, the image capture device 100 is, for instance, disposed in correspondence to a pillow region on a bed, and the electronic system 100 can be configured to observe whether the face, head, or shoulder of a target (e.g., a bed occupant) enters or leaves the pillow region so as to determine if the target is laid down or upright. In the following, the image analysis method of the invention is described in detail with the embodiment above as an example, but the invention is not limited to the embodiment.

The image capture device 110 is disposed in correspondence to the preset scenery and configured to continuously or discontinuously capture a plurality of images. Specifically, the image capture device 110 is disposed in a manner that the field of view thereof includes the preset scenery. In some embodiments, the image capture device 110 is, for instance, an infrared camera and is disposed to capture the entire preset scenery. In other embodiments, the image capture device 110 can also function as a device such as a black and white camera or a color camera as needed, and the invention is not limited thereto.

The processor 120 is configured to obtain the plurality of images captured by the image capture device 110 from the image capture device 110 and determine whether the target enters or leaves the preset scenery. In some embodiments, the processor 120 further sends a prompt message via a prompt device 130 after determining whether the target enters or leaves the preset scenery to prompt the entry or exit of the target in the preset scenery. In some embodiments, the processor 130 can be, for instance, a dual core, quad core, or eight core central processing unit (CPU), system-on-chip (SOC), application processor, media processor, microprocessor, digital signal processor, or other similar devices, and the processor type used in implementation is not limited in the invention.

The prompt device 130 is configured to send a prompt message according to the instruction of the processor 120 (such as prompting a user has entered the preset scenery or prompting the user has left the preset scenery). In some embodiments, the prompt device 130 is, for instance, one of a speaker, a display, and a communication module, or a combination thereof. The speaker can send a prompt message to prompt the user via a sound; the display can send a prompt message to prompt the user via a figure or text; and the communication module can send a prompt message to prompt the user via a method such as an e-mail or a phone message. Those having ordinary skill in the art can design or modify the embodiments of the invention as needed to implement the prompt device 130 sending a prompt message to a user, and the invention does not limit the specific implementation of the prompt device 130.

To facilitate the process, the processor 120 assigns one binary parameter as an indicator in the process of a number of embodiments below, wherein the value thereof is 0 or 1 and 0 is the default. The indicator may be set to 0 or 1 by the processor 120 in the process of the image analysis method to indicate that the currently observed target may be laid down or upright. More specifically, the indicator being 0 represents that the observed target is not laid down or not upright, and the indicator being 1 represents that the observed target is probably laid down or probably upright.

Figure 2A:
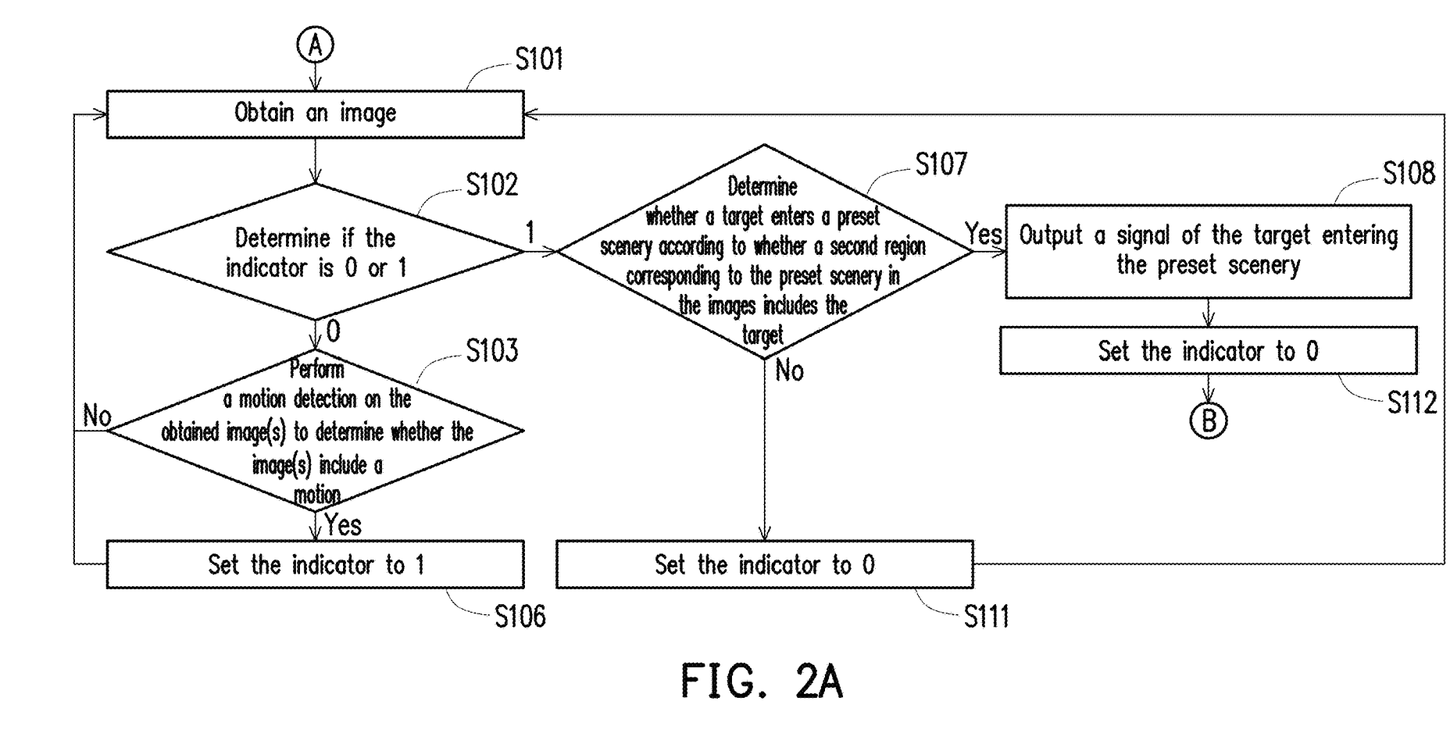
FIG. 2A shows a flowchart of an image analysis method determining whether a target enters a preset scenery in an embodiment of the invention.

FIG. 2A shows a flowchart of an image analysis method determining whether a target enters a preset scenery in an embodiment of the invention. The image analysis method introduced in the embodiment of FIG. 2A is applicable to the electronic system 100 of the embodiment of FIG. 1, and therefore description is provided below with reference to the various elements in the electronic system 100. As described above, in the present embodiment, a system determining whether the observed target is laid down is used as an example of the electronic system 100, but the invention is not limited thereto.

Referring to FIG. 2A, in step S101, the processor 120 obtains an image captured by the image capture device 110, and then in step S102, determines if the indicator is 0 or 1. If the indicator is 0, then step S103 is performed, otherwise step S107 is performed.

Specifically, the image capture device 110 obtains an image at a specific frame rate (including but not limited to 30 fps), and the image can include, for instance, a scenery other than the preset scenery, but the invention is not limited thereto. To reduce computation and increase accuracy, in some embodiments, the processor 120 selects a region of interest (ROI) including the preset scenery in the image and only obtains the ROI portion in the image. In the following description, the images obtained by the processor 120 from the image capture device 110 are all partial images located in the ROI. However, the invention is not limited thereto.

Figure 4:
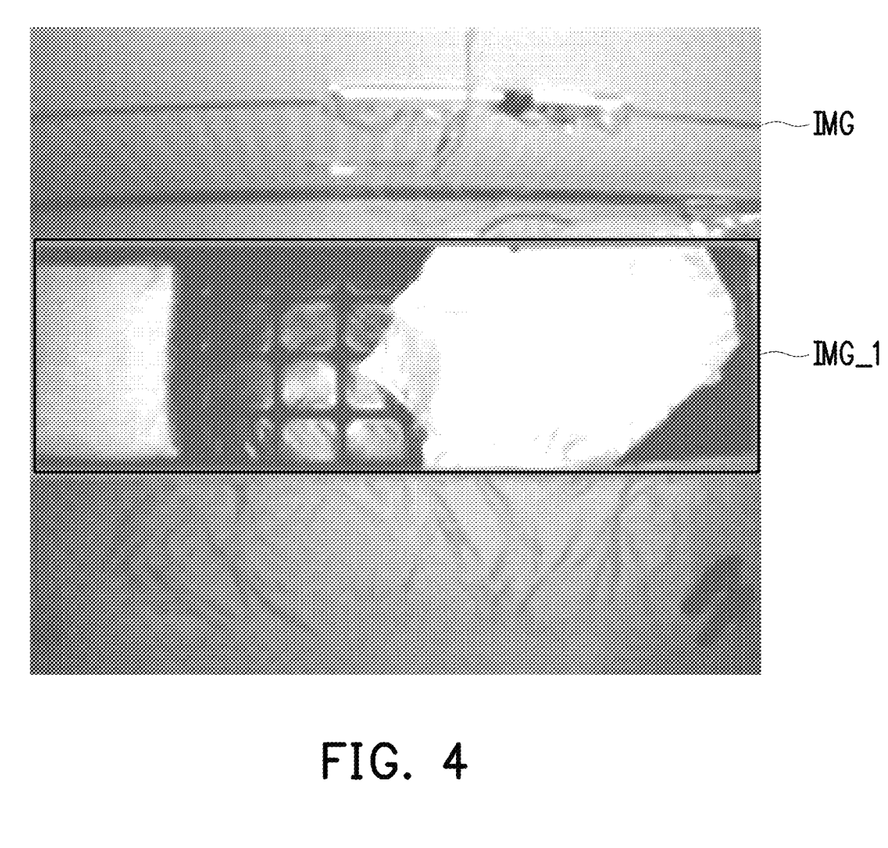
FIG. 4 shows a schematic of image acquisition in an embodiment of the invention.

FIG. 4 shows a schematic of image acquisition in an embodiment of the invention.

Referring to FIG. 4, in the present embodiment, an image IMG captured by the image capture device 110 may include almost the entire bed and the scenery other than the bed, including the pillow region used as the preset scenery. Therefore, the processor 120, for instance, selects a bed region as the ROI to obtain a first image IMG_1, including a pillow region for which the top ⅔ of the bed is used as the preset scenery.

In step S103, the processor 120 performs a motion detection on the captured image to determine whether the image includes a motion. If a motion is absent, then step S101 is repeated to obtain another image. Otherwise, a target may have entered the preset scenery, and step S106 is performed to set the indicator to 1, and then step S101 is repeated to capture another image to perform further determination.

Specifically, the motion detection performed by the processor 120 includes, for instance, computing an image difference between two images obtained at different time points to generate a motion image according to the image difference. Therefore, if a certain extent of difference exists between two images obtained at different time points, then a motion exists between the two images. Otherwise, image capture is resumed for determination.

In the present embodiment, the fixed interval of different time points is, for instance, an 8-frame time. In other words, after the processor 120 obtains the first image IMG_1 of the first frame, the processor 120 obtains the first image IMG_1 of the ninth frame to determine whether the first image IMG_1 of the first frame and the ninth frame includes a motion. If the first image IMG_1 of the first frame and the ninth frame is determined to include a motion, then step S106 is performed. On the other hand, if the first image IMG_1 of the first frame and the ninth frame is determined to not include a motion, then the first image IMG_1 of the seventeenth frame is obtained to determine whether the first image IMG_1 of the ninth frame and the seventeenth frame includes a motion . . . etc.

In some embodiments, to reduce the interval for determination to increase accuracy, the processor 120 further obtains and records the first image IMG_1 of the fifth frame between the first frame and the ninth frame and the first image IMG_1 of the thirteenth frame between the ninth frame and the seventeenth frame to determine whether the first image IMG_1 of the fifth frame and the thirteenth frame includes a motion. As a result, when the first image IMG_1 of the first frame and the ninth frame is determined to not include a motion and the first image IMG_1 of the seventeenth frame is not obtained, the processor 120 can determine whether the first image IMG_1 of the fifth frame and the thirteenth frame includes a motion. In other words, the motion is also determined with an 8-frame time as the fixed interval, but the frequency of the determination is increased.

In the present embodiment, if the first image IMG_1 includes a motion, then the face or head of the observed target possibly enter the pillow region, i.e., the observed target is probably laid down. Therefore, after the first image IMG_1 is determined to include a motion, the processor 120 first sets the indicator to 1 in step S106, and then step S101 is repeated to obtain the next image for image analysis to determine whether the face or head of the observed target does enter the pillow region.

It should be mentioned that, the first images IMG_1 above are all used for motion detection, and the processor 120 does not perform an image analysis operation on the first images IMG_1. Next, the processor 120 sets the indicator to 1 in step S106, and then step S101 is repeated to obtain an image for image analysis, wherein the image is referred to as a second image IMG_2 or a follow-up image. In short, the image obtained when the indicator is 0 is referred to as the first image IMG_1, and the image obtained when the indicator is 1 is referred to as the second image IMG_2. In other words, the image for motion detection but not image analysis (such as step S107 and subsequent steps of step S107) is referred to as the first image IMG_1, and the image for image analysis (such as step S107 and the subsequent steps of step S107) is referred to as the second image IMG_2. It should be mentioned that, the first image IMG_1 and the second image IMG_2 are both obtained by the processor 120 from the image capture device 110, and other than capture time, the two are substantially the same.

After the first image IMG_1 is determined to include a motion, the indicator is 1, and therefore after step S101 is repeated to obtain the second image IMG_2, the process jumps from step S102 to step S107. In step S107, the processor 120 determines whether the target enters the preset scenery according to whether the scenery region (also referred to as the second region in the present specification) corresponding to the preset scenery in the image includes the target. If yes, then the target enters the preset scenery and step S108 is performed. Otherwise, although the first image IMG_1 includes a motion, the target does not enter the preset scenery due to the motion, and therefore step S111 is performed to reset the indicator to zero and then step S101 is repeated.

Specifically, the ROI includes the preset scenery, and can also include a scenery other than the preset scenery. To reduce computation, the processor 120, for instance, only performs an image analysis on the scenery region corresponding to the preset scenery (i.e., the second region) in the second image IMG_2 to search for the target according to specific features of the target to determine whether the target is in the preset scenery.

Figure 7:
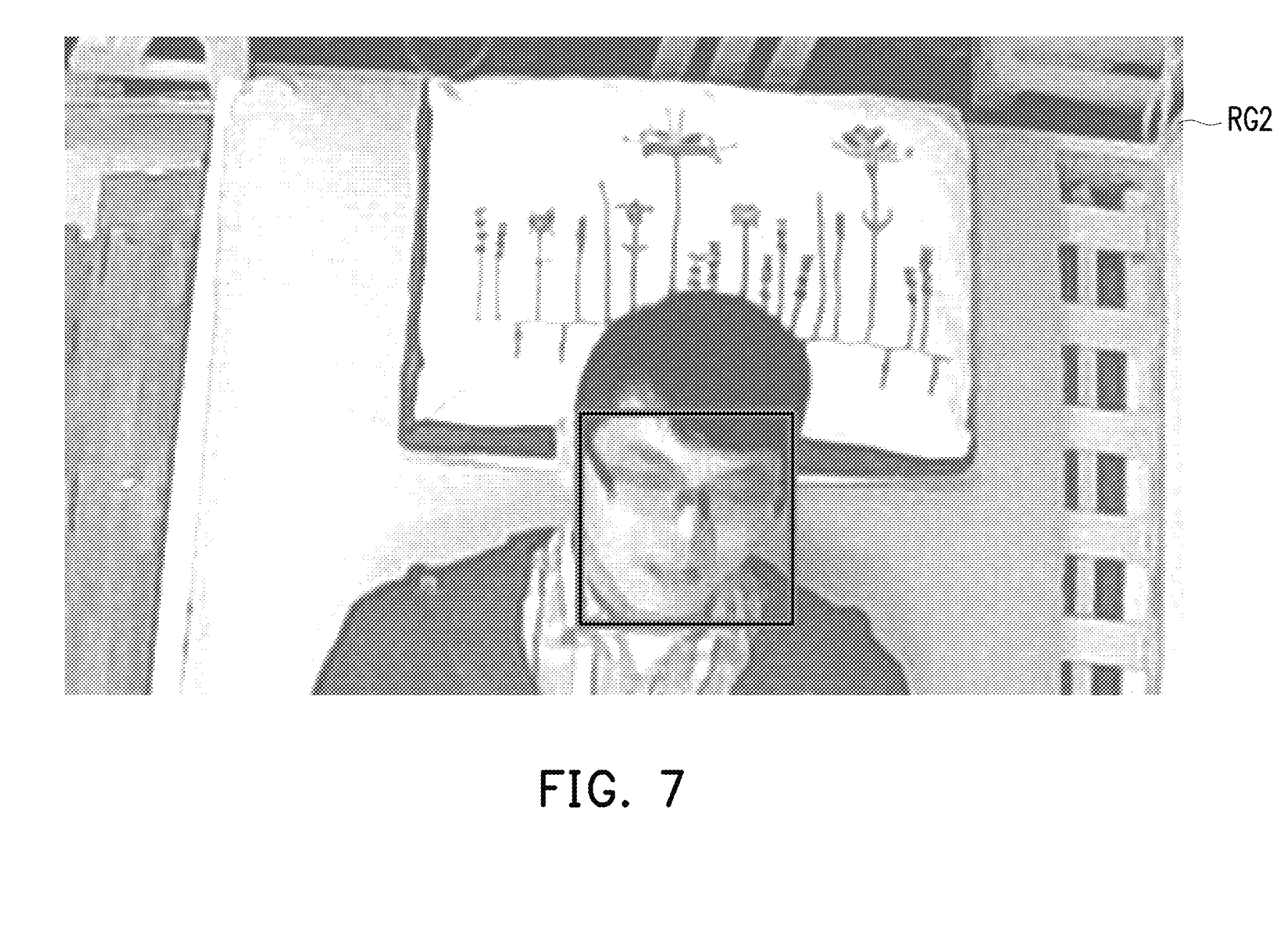
FIG. 7 shows a schematic of target search in a scenery region in an embodiment of the invention.

FIG. 7 shows a schematic of target search in a scenery region in an embodiment of the invention.

Referring to FIG. 7, the ROI of the present embodiment is, for instance, the top ⅔ of the bed, and the second region RG2 is the upper half region of the image corresponding to the pillow region. In the present embodiment, the processor 120, for instance, searches for specific features (including but not limited to, the nose) of the face of the observed target in the second region RG2 of the second image IMG_2. If the processor 120 finds the specific features of the face of the observed target in the second region RG2 of the second image IMG_2, then the face of the observed target has entered the pillow region, i.e., the observed target is laid down. Otherwise, the face of the observed target has not entered the pillow region, i.e., the observed target is not laid down.

In step S108, the processor 120 outputs a signal of the target entering the preset scenery, and then step S112 is performed to reset the indicator to 0. Specifically, the processor 120 can, for instance, output the signal of the target entering the preset scenery via the prompt device 130, but the invention is not limited thereto. In the present embodiment, the processor 120, for instance, outputs a signal corresponding to "the observed target is laid down". In some embodiments, after step S112, the processor 120 performs the process of FIG. 3, but the invention is not limited thereto.

According to the embodiments above, the processor 120 performs a motion detection requiring less computation on the first images IMG_1 and performs an image analysis requiring more computation on the second image IMG_2 only after confirming the first images IMG_1 includes a motion. As a result, accuracy, high efficiency, and low cost are achieved.

Figure 2B:
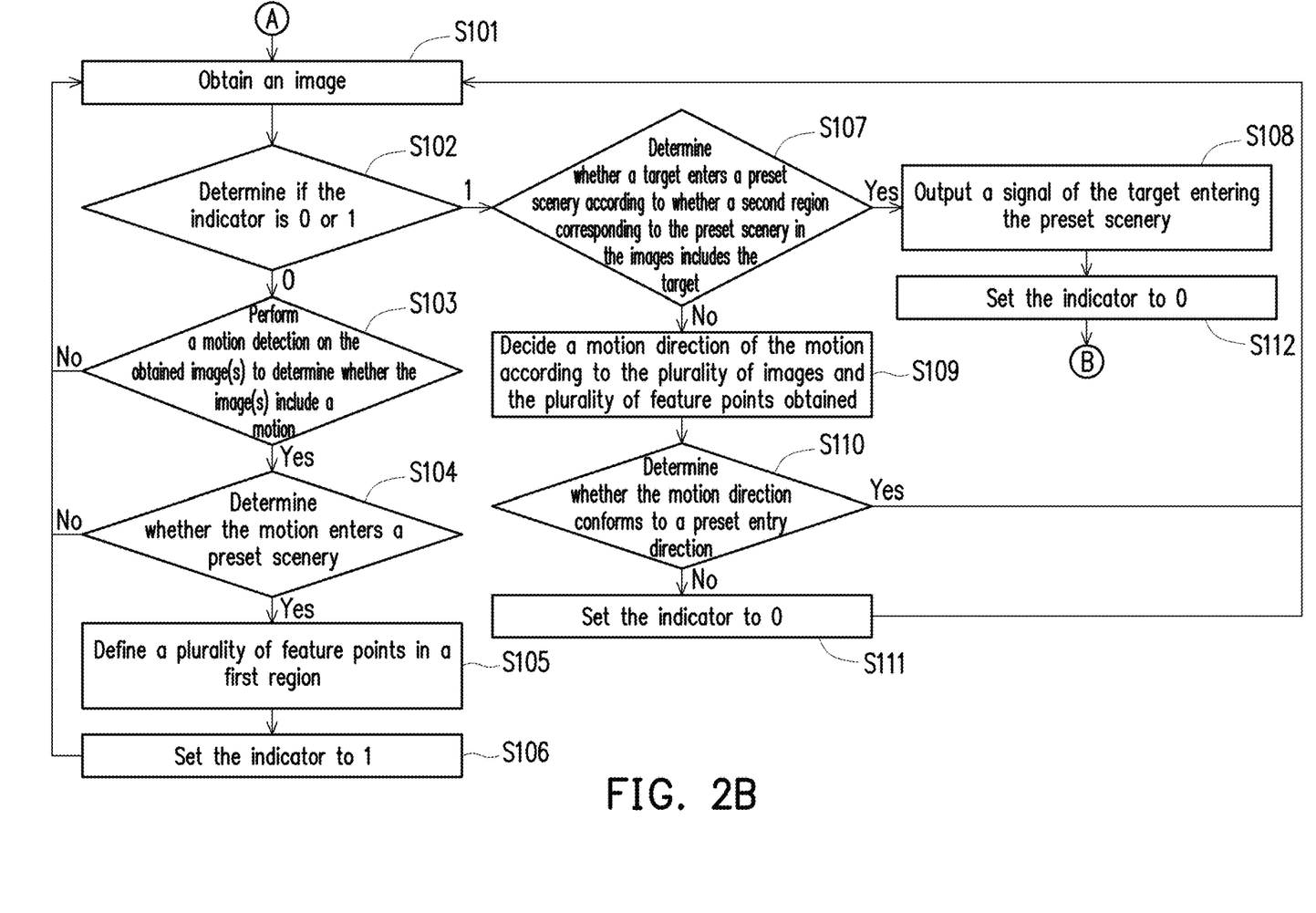
FIG. 2B shows a flowchart of an image analysis method determining whether a target enters a preset scenery in another embodiment of the invention.

FIG. 2B shows a flowchart of an image analysis method determining whether a target enters a preset scenery in another embodiment of the invention. Similarly, the image analysis method introduced in the embodiment of FIG. 2B is applicable to the electronic system 100 of the embodiment of FIG. 1, and therefore description is provided below with reference to the various elements in the electronic system 100. As described above, in the present embodiment, a system determining whether the observed target is laid down is used as an example of the electronic system 100, but the invention is not limited thereto.

The embodiment of FIG. 2 includes each step of the embodiment of FIG. 2A, and detailed descriptions of the same steps are provided in the embodiment of FIG. 2A and are not repeated herein. However, in addition to including all of the steps in the embodiment of FIG. 2A, the embodiment of FIG. 2B further includes steps S104, S105, S109, and S110 to increase the accuracy of determination and increase the efficiency. The detailed process is described below.

Referring to FIG. 2B, in step S101, the processor 120 obtains a plurality of images captured by the image capture device 110, and then in step S102, determines if the indicator is 0 or 1. If the indicator is 0, then step S103 is performed, otherwise step S107 is performed. In step S103, the processor 120 performs a motion detection on the captured images to determine whether the images include a motion. If a motion is absent, then step S101 is repeated to obtain another image. Otherwise, step S104 is performed to further determine the detected motion.

In step S104, the processor 120 determines whether the motion enters a preset scenery. If the motion is determined to enter the preset scenery, then the target may have entered the preset scenery, and then after step S105 is performed, step S106 is performed to set the indicator to 1; otherwise, step S101 is directly repeated to obtain another image.

Specifically, the first image IMG_1 obtained by the processor 120 probably capture a scenery other than the preset scenery, and if the motion in the scenery other than the preset scenery does not enter the preset scenery, then the target does not enter the preset scenery. Therefore, even if the first image IMG_1 includes a motion, if the processor 120 determines the motion does not enter the preset scenery, then step S101 is still repeated to obtain another image. In the present embodiment, if the motions of the first image IMG_1 are all limited to the lower half of the first image IMG_1, then the face or head of the observed target does not enter the second region RG2 corresponding to the preset scenery, and step S101 is repeated.

Moreover, if the processor 120 determines the motion enters the preset scenery, then in step S105, a plurality of feature points are defined in the first region RG1 according to the first image IMG_1. Specifically, the first region RG1 is obtained according to the motion in the first image IMG_1 to represent the possible region the target is located in the image. Therefore, by defining a plurality of feature points in the first region RG1, the dynamic (e.g., movement direction, etc.) of the target can be determined by tracking the feature points.

Figure 5A:
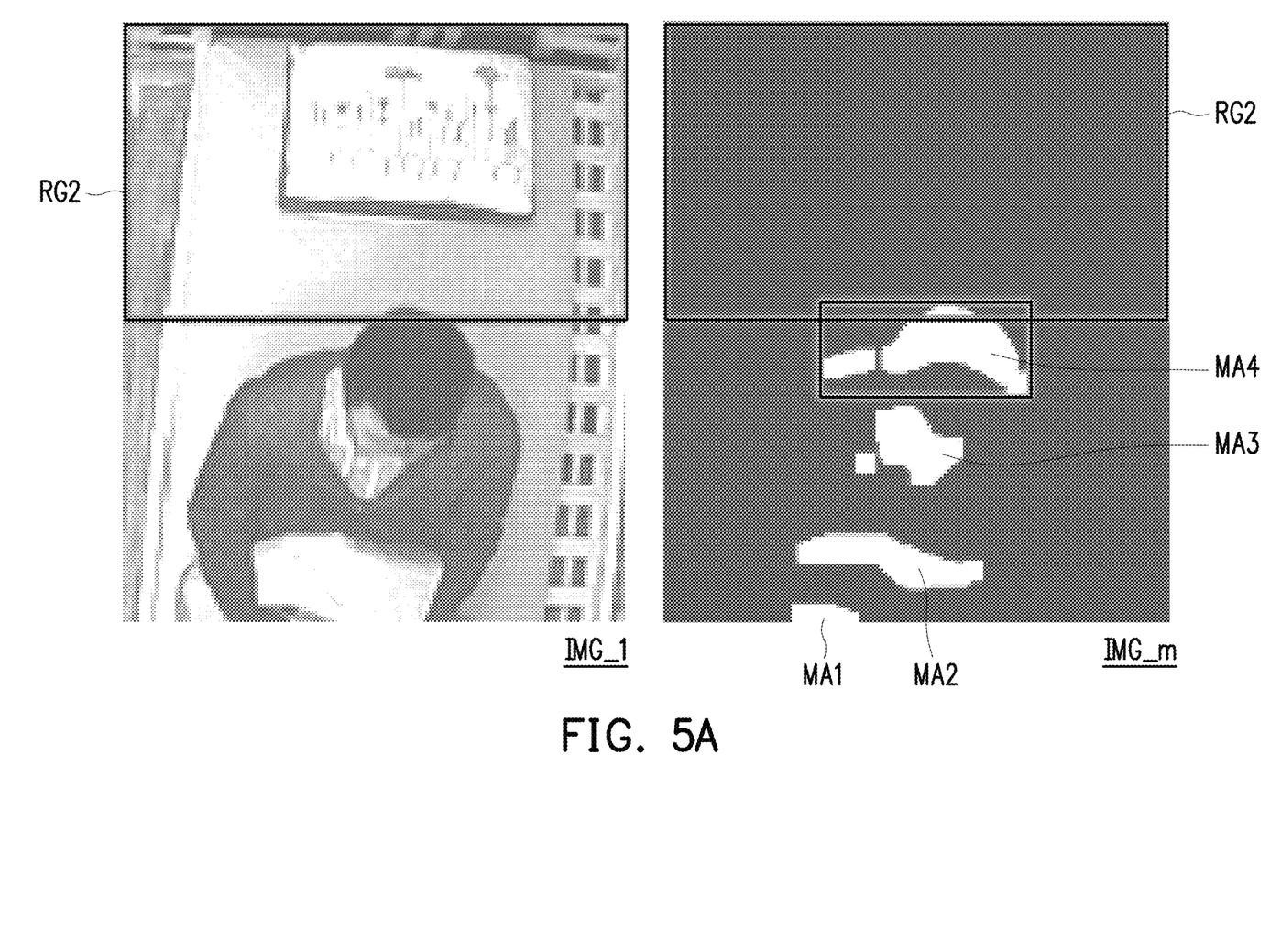
FIG. 5A shows a schematic of motion image acquisition in an embodiment of the invention.
Figure 5B:
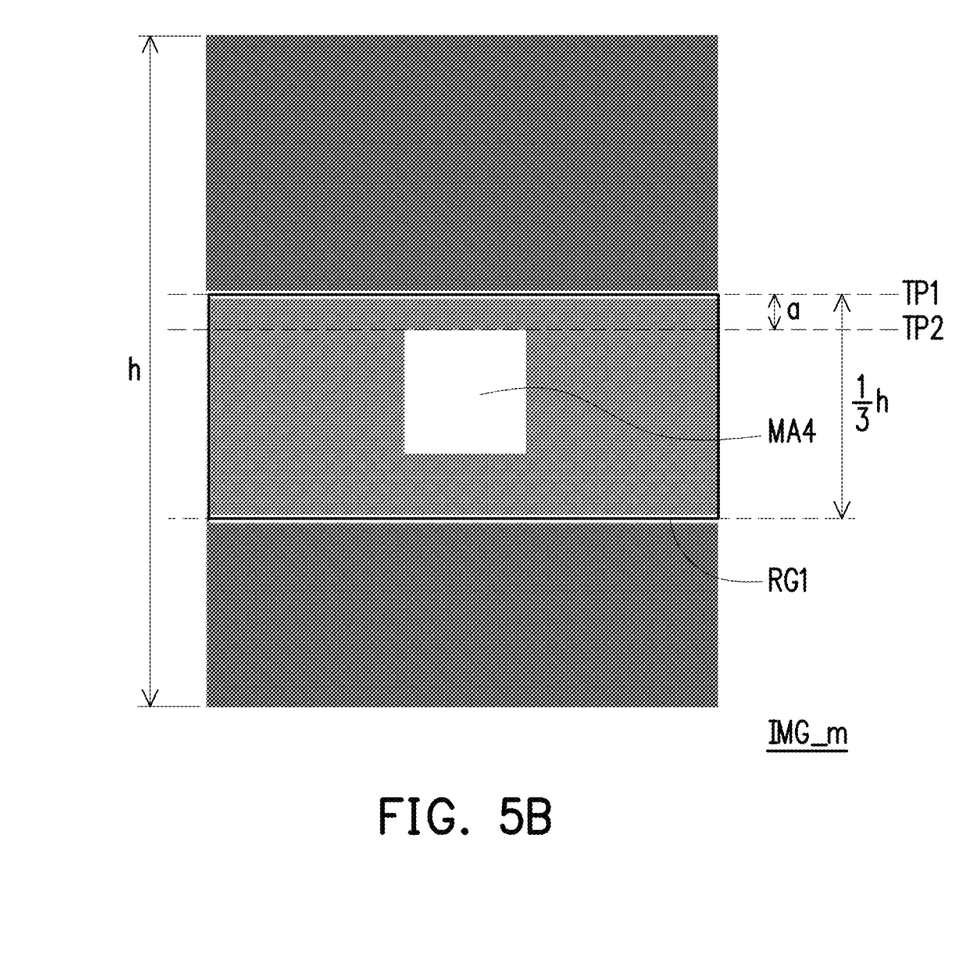
FIG. 5B shows a schematic of the determination of a first region in an embodiment of the invention.

FIG. 5A shows a schematic of a motion image obtained in an embodiment of the invention, and FIG. 5B shows a schematic of the determination of a first region in an embodiment of the invention.

Referring to FIG. 5A, in the present embodiment, after the first image IMG_1 is determined to include a motion, the processor 120 obtains a motion image IMG_m of the first image IMG_1. For instance, the processor 120 computes the difference between corresponding pixels of two first images IMG_1, and constructs the motion image IMG_m by using the difference. Therefore, regions in which the pixel value is not 0 (such as regions shown in white in the motion image IMG_m) in the motion image IMG_m are all motion regions.

It should be mentioned that, for clarity, FIG. 5A only shows a single first image IMG_1. The processor 120 in actuality obtains two first images IMG_1 captured at different times to compute the motion image IMG_m.

In the present embodiment, after finding the motion regions, the processor 120 further filters the motion regions according to the area of the motion regions to filter out undesired noise. For instance, the processor 120 can, for instance, compute the average area of all of the motion regions and keep motion regions MA1, MA2, MA3, and MA4 for which the area is greater than the average area.

In some embodiments, the processor 120 can, for instance, execute step S104 at this point and determine whether the motion enters the preset scenery according to the motion regions MA1, MA2, MA3, and MA4 kept. For instance, the processor 120 determines whether portions in the motion regions MA1, MA2, MA3, and MA4 overlapped with the scenery region (second region) RG2 exist. As shown in FIG. 5A, since the motion region MA4 is overlapped with the second region RG2, the processor 120 can determine the motion enters the preset scenery in step S104.

Next, the processor 120 selects the target region from the motion regions MA1, MA2, MA3, and MA4 kept according to the preset scenery. In the present embodiment, the processor 120 selects the topmost motion region MA4 as the target region and decides the first region RG1 according to the target region MA4.

Referring to FIG. 5B, the processor 120, for instance, presets the total height of the first region RG1 to one-third a height h of the image (e.g., the first image IMG_1, the second image IMG_2, or the motion image IMG_m) and makes a top edge TP1 of the first region RG1 higher than a top edge TP2 of the target region MA4 by a preset height a (e.g., 15 pixels) to decide the first region RG1. Accordingly, when the feature points are subsequently defined, the feature points (e.g., at the top of a target, probably) of an object moving in the target region MA4 can be ensured to be better defined. For example, in the present embodiment, the object moving in the target region MA4 may include the top of the head of the observed target, and therefore a plurality of feature points can also be well defined at the top of the head of the observed target.

It should be mentioned that, although in the embodiment above, the method of deciding the first region RG1 used to define the features points is introduced, the invention is not limited to the embodiment above. Those having ordinary skill in the art can decide the first region RG1 used to define the feature points themselves based on their experience or needs.

After the first region RG1 is decided, the processor 120 can define a plurality of feature points in step S105.

Figure 6A:
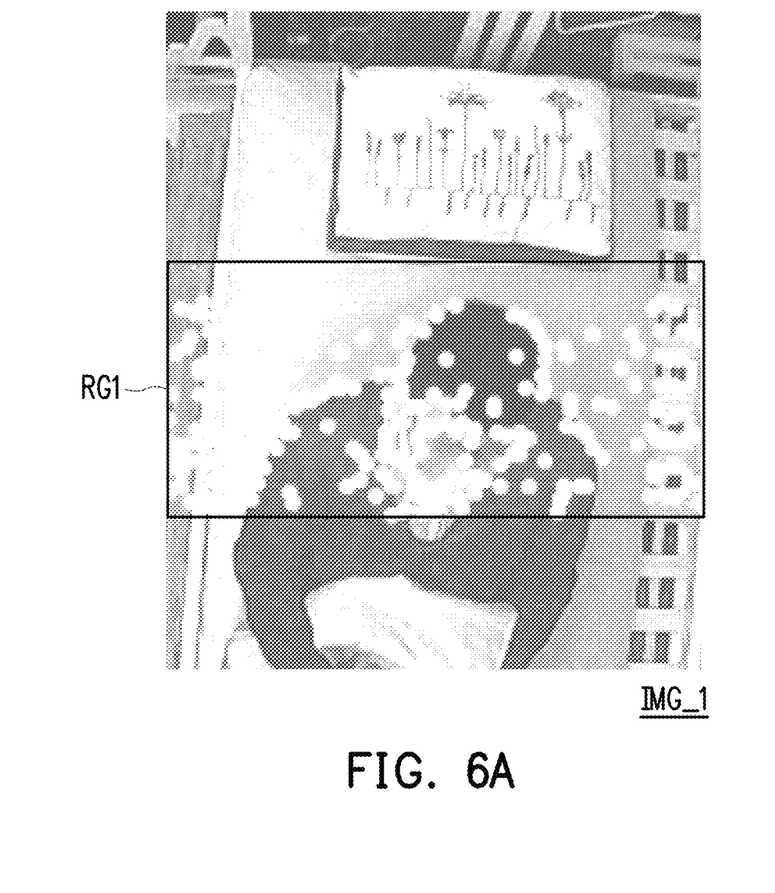
FIG. 6A shows a schematic of the definition of a plurality of feature points in an embodiment of the invention.

FIG. 6A shows a schematic of the definition of a plurality of feature points in an embodiment of the invention.

Referring to FIG. 6A, in the present embodiment, the processor 120 finds the feature points (such as a boundary point or corner point, represented by a white dot in FIG. 6A) in the first region RG1 of the first image IMG_1 using an OpenCV Lucas-Kanade optical flow algorithm. However, the invention is not limited thereto, and those having ordinary skill in the art can obtain an algorithm (such as the Canny edge detection algorithm or the Harris angle detection algorithm) sufficient to search for feature points from relevant literature.

After the feature points are defined, step S106 is performed, the processor 120 sets the indicator to 1, and step S101 is repeated to obtain the next image (the second image IMG_2).

Similar to the embodiment of FIG. 2A, the process continues to step S107, and the processor 120 determines whether the target enters the preset scenery according to whether the scenery region RG2 corresponding to the preset scenery in the image includes the target. If yes, then the target enters the preset scenery, and step S108 is performed for output.

Moreover, if the processor 120 determines the target does not enter the preset scenery in step S107, then the motion in the first image IMG_1 does not move the target into the preset scenery or the motion in the first image IMG_1 does not fully move the target into the preset scenery, and therefore the target does not enter the preset scenery. Therefore, step S109 is performed, and the processor 120 continues to decide a motion direction of the motion according to the plurality of images and the plurality of feature points obtained to determine whether the motion in the first image IMG_1 is a motion moving the target into the preset scenery.

Specifically, the processor 120 decides the motion direction of the motion from the location changes (such as optical flow information) of the feature points according to the plurality of feature points defined in the first image IMG_1 and the corresponding feature points in the second image IMG_2.

Figure 8:
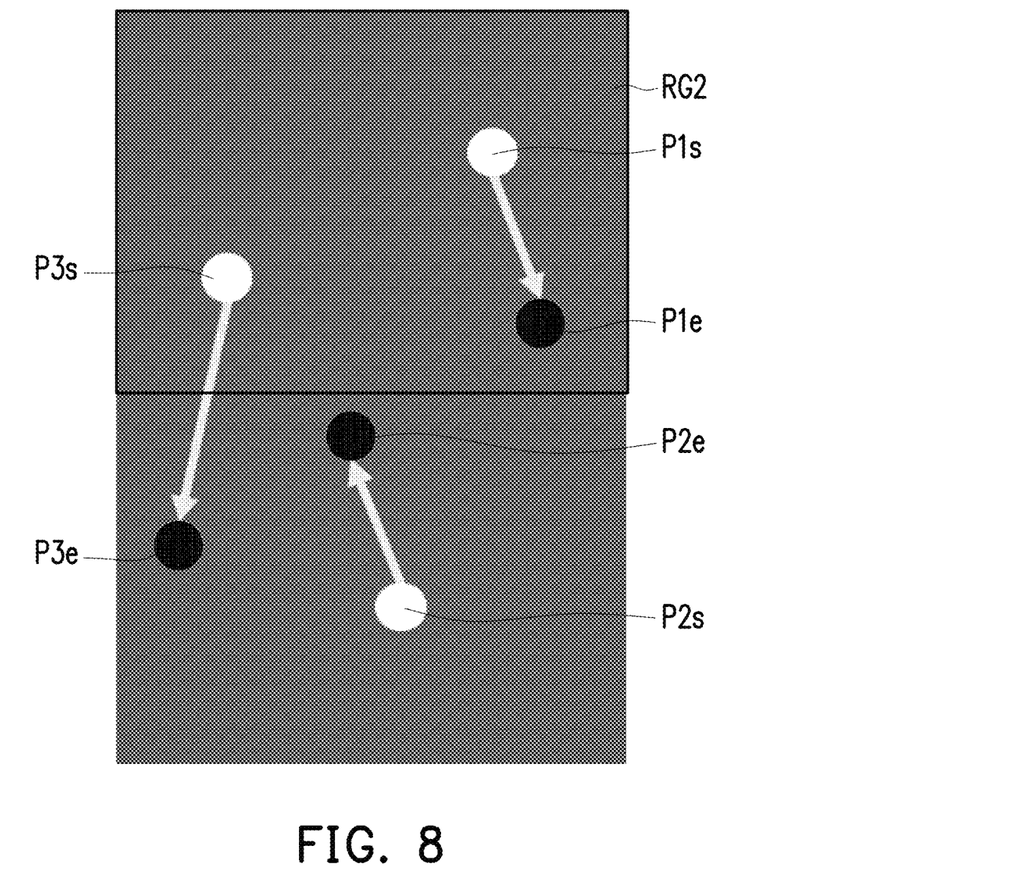
FIG. 8 shows a schematic of the determination of a motion direction of a motion according to optical flow information in an embodiment of the invention.

FIG. 8 shows a schematic of the determination of a motion direction of a motion according to an optical flow information in an embodiment of the invention.

Referring to FIG. 8, locations p1s, p2s, and p3s are, for instance, locations of a plurality of feature points in any first image IMG_1 or the first image IMG_1 causing the indicator to be switched to 1, and locations p1e, p2e, and p3e are, for instance, locations of a plurality of feature points in the corresponding second image IMG_2, and the arrows represent the displacement amount of each feature point, also referred to as optical flow information. For instance, one feature point is moved from the location p1s to the location p1e, another feature point is moved from the location p2s to the location p2e, and yet another feature point is moved from the location p3s to the location p3e. Therefore, as long as the optical flow information is obtained according to the feature points defined in step S105, computation can be performed to determine the motion direction of the motion.

In step S110, the processor 120 determines whether the motion direction conforms to the preset entry direction. Specifically, if the motion direction conforms to the preset entry direction, then the motion may still be a motion moving the target into the preset scenery, however the target has not entered the preset scenery yet, and therefore the indicator is not reset to zero and step S101 is directly repeated to obtain the next image (second image) such that the process can continue to step S107 to determine whether the target enters the preset scenery. On the other hand, if the motion direction does not conform to the preset entry direction, then the motion is not a motion moving the target into the present scenery, and therefore after step S111 is performed to reset the indicator to zero, step S101 is repeated.

In the present embodiment, since the scenery region or the second region RG2 is located in the top half of the image, the preset entry direction is "up". The processor 120 determines the feature points having a displacement vector pointing up in all of the feature points from the optical flow information and determines whether the end of the feature points is located in the scenery region RG2. In the case of FIG. 8, the processor 120 determines the feature point moved from the location p1s to the location p1e and the feature point moved from the location p3s to the location p3e are feature points having a displacement vector pointing down, and the feature point moved from the location p2s to the location p2e is a feature point having a displacement vector pointing up, and only the end of one feature point is located in the scenery region RG2 (i.e., the location p1e).

In the present embodiment, if the processor 120 determines the total number of feature points having "a displacement vector pointing up and an end located in the second region RG2" exceeds a specific ratio of the total number of feature points (including but not limited to 70%), then the motion direction is determined to conform to the preset entry direction "up", and the indicator is not reset to zero and step S101 is performed. Otherwise, step S111 is performed to reset the indicator to zero and then step S101 is repeated.

It should be mentioned that, the upward pointing direction in the present specification does not necessarily mean pointing straight up, and those having ordinary skill in the art can define the scope of "pointing up" as needed. Similarly, the downward direction does not necessarily mean pointing straight down, and those having ordinary skill in the art can also define the scope of "pointing down" as needed.

In comparison to the embodiment of FIG. 2A, the process of the embodiment of FIG. 2B can more accurately analyze the images and increase the efficiency. After the target is determined to enter the preset scenery, whether the target in the preset scenery leaves the preset scenery can be further determined.

Figure 3:
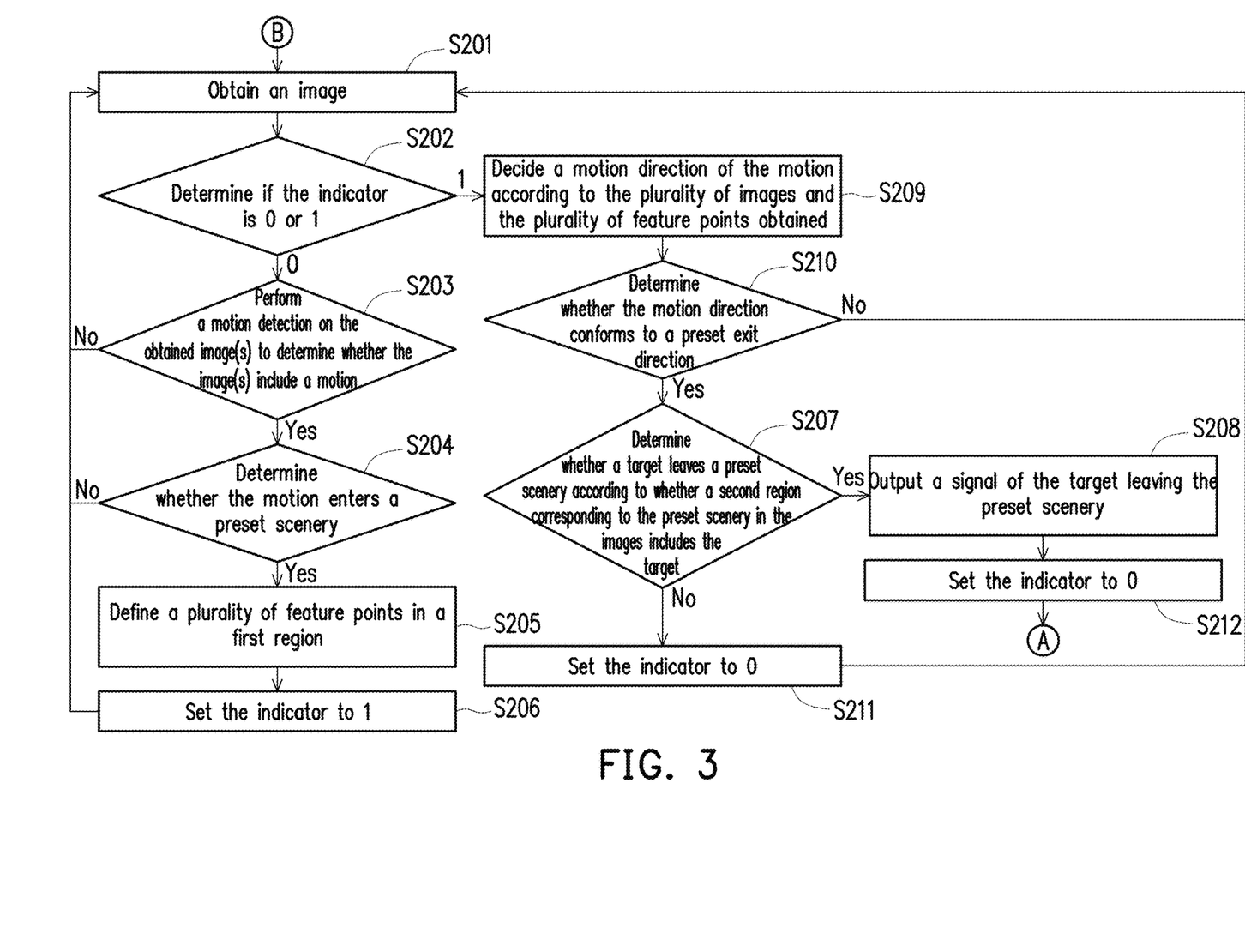
FIG. 3 shows a flowchart of an image analysis method determining whether a target leaves a preset scenery in an embodiment of the invention.

FIG. 3 shows a flowchart of an image analysis method determining whether a target leaves a preset scenery in an embodiment of the invention. The image analysis method introduced in the embodiment of FIG. 3 is applicable to the electronic system 100 of the embodiment of FIG. 1, and therefore description is provided below with reference to the various elements in the electronic system 100. As described above, in the present embodiment, a system determining whether the observed target is upright is used as an example of the electronic system 100. In other words, the target is still the face of the observed target, and the preset scenery is still the pillow region, but the invention is not limited thereto.

Similar to the embodiments of FIG. 2A and FIG. 2B, the processor 120 in the embodiment of FIG. 3 also first performs a motion detection requiring less computation on the first images IMG_1 when determining whether the target leaves the preset scenery, and only performs image analysis requiring more computation on the second image IMG_2 after continuing the first images IMG_1 include a motion to analyze whether the target leaves the preset scenery. Therefore, the details of each of steps S201 to S212 of the embodiment of FIG. 3 are respectively similar to the details of each of steps S101 to S112 of the embodiment of FIG. 2B, and the same portions are not repeated in the following.

In particular, in the embodiments of FIG. 2A and FIG. 2B, the target is regarded as not entering the preset scenery if the target is not found in the second region RG2, but in the embodiment of FIG. 3, even if the target is not found in the second region RG2, the specific features of the target may still be changed in direction or covered but are still in the preset scenery. To solve the above issue, the determination processes of the embodiment of FIG. 3 and the embodiment of FIG. 2B are slightly different to more accurately determine whether the target leaves the preset scenery.

Referring to FIG. 3, in step S201, the processor 120 obtains a plurality of images captured by the image capture device 110, and then in step S202, determines if the indicator is 0 or 1. If the indicator is 0, then step S203 is performed to perform a motion detection on the obtained images to determine whether the images include a motion. If the images are determined to not include a motion, then step S201 is repeated to obtain another image (the first image IMG_1). On the other hand, if the images are determined to include a motion, then step S204 is performed next to determine whether the motion enters the preset scenery.

Specifically, similar to the embodiment of FIG. 2B, the processor 120 obtains a motion image and determines whether the motion region therein is overlapped with the second region RG2. If the motion region is not overlapped with the second region RG2, then the motion is not related to whether the target leaves the preset scenery, and therefore step S201 is repeated to obtain another image. On the other hand, if the motion region is overlapped with the second region RG2, then steps S205 and S206 are performed to set the indicator to 1, and then step S201 is repeated to obtain the next image (the second image IMG_2).

In the present embodiment, if the observed target is to be upright, then a motion inevitably occurs in the pillow region. Therefore, if the motion region is not overlapped with the second region RG2, then the motion may occur outside the pillow region and not be related to the rising of the observed target (e.g., may be the hands and feet or other motions in the images).

In step S205, the processor 120 defines a plurality of feature points in the first region. Details of the plurality of feature points defined in the first region are provided in the description of step S105 and are therefore not repeated herein.

Figure 6B:
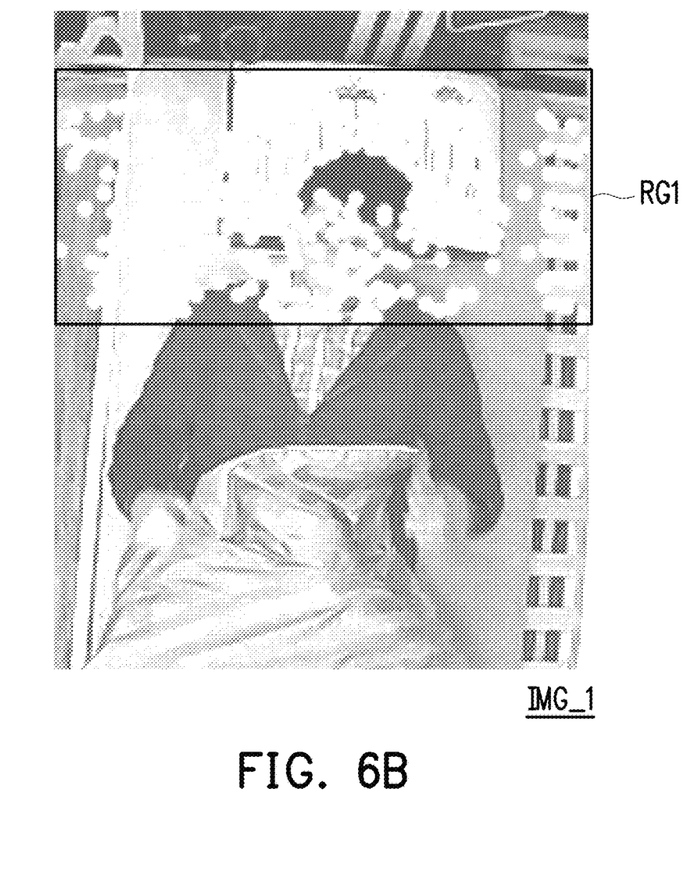
FIG. 6B shows a schematic of the definition of a plurality of feature points in another embodiment of the invention.

FIG. 6B shows a schematic of the definition of a plurality of feature points in an embodiment of the invention.

Referring to FIG. 6B, similar to step S105, in the present embodiment, the topmost motion region in the motion image IMG_m is also used as the target region, and the top edge TP2 of the target region is raised by the preset height a as the top edge TP1 of the first region RG1 to decide the first region RG1 having a height of h/3 so as to define a plurality of feature points therein. Accordingly, the top of the head of the observed target can be ensured to also define a plurality of feature points well.

In step S206, after the indicator is set to 1 and step S201 is repeated to obtain the second image IMG_2, step S207 is not directly performed after step S202 to determine whether the scenery region or the second region RG2 includes the target, but instead steps S209 and S210 are performed first to decide the motion direction of the motion in step S209 and whether the motion direction conforms to the preset exit direction in step S210.

Specifically, even if a motion occurs to the target which is already located in the preset region, the target still most likely does not exit the preset region. For instance, when the observed target is turned on the bed, the face of the observed target does not necessarily leave the pillow region and the observed target does not necessarily rise. As another example, when the observed target pulls the comforter up and covers the face, the face of the observed target does not necessarily leave the pillow region and the observed target does not necessarily rise. Accordingly, by performing step S209 and step S210 first, many motions not moving the target out of the preset region can be filtered out to increase the determination accuracy and efficiency.

The details of step S209 are similar to those of step S109 and are not repeated herein. In step S210, the processor 120 determines whether the motion direction conforms to the preset exit direction. If the motion direction conforms to the preset exit direction, then step S207 is performed to search for the target in the second region RG2 of the second image IMG_2 to determine whether the target leaves the preset scenery. On the other hand, if the motion direction does not conform to the preset exit direction, then step S201 is repeated to obtain the next image.

In the present embodiment, the preset exit direction is "down". The processor 120 determines the feature points having a displacement vector pointing down in all of the feature points from the optical flow information and determines whether the end of the feature points is located outside the scenery region RG2. In the case of FIG. 8, the processor 120 determines the feature point moved from the location p1s to the location p1e and the feature point moved from the location p3s to the location p3e are feature points having a displacement vector pointing down, but only the end of one feature point is located outside the scenery region RG2 (i.e., the location p3e), and the feature point moved from the location p2s to the location p2e is a feature point having a displacement vector pointing up.

In the present embodiment, if the processor 120 determines the total number of feature points having "a displacement vector pointing down and an end located outside the second region RG2" exceeds a specific ratio of the total number of feature points (including but not limited to 70%), then the motion direction is determined to conform to the preset exit direction pointing "down", and step S207 is performed. Otherwise, step S201 is repeated to obtain the next image.

It should be mentioned that, the downward pointing direction in the present specification does not necessarily mean pointing straight down, and those having ordinary skill in the art can define the scope of "pointing down" as needed. Similarly, the upward-pointing direction does not necessarily mean pointing straight up, and those having ordinary skill in the art can also define the scope of "pointing up" as needed.

In step S207, the processor 120 determines whether the target leaves the preset scenery according to whether the second region RG2 corresponding to the preset scenery in the image includes the target. If yes, then step S208 is performed. Otherwise, the target does not leave the preset scenery due to the motion, and therefore step S211 is performed to reset the indicator to zero, and then step S201 is repeated. In step S208, the processor 120 outputs a signal of the target leaving the preset scenery, and then step S212 is performed to reset the indicator to 0.

Referring again to FIG. 7, the ROI of the present embodiment is, for instance, the top ⅔ of the bed, and the second region RG2 is the upper half region of the image corresponding to the pillow region. In the present embodiment, the processor 120, for instance, searches for specific features of the face of the observed target in the second region RG2 of the second image IMG_2 (including but not limited to, the nose). If the processor 120 does not find the specific features of the face of the observed target in the second region RG2 of the second image IMG_2, then the face of the observed target has left the pillow region, i.e., the observed target is confirmed to be upright, and therefore a signal corresponding to the rise of the observed target is outputted. Otherwise, the face of the observed target is still in the pillow region, i.e., the observed target did not rise.

Via a process slightly different from the embodiment of FIG. 2B, the embodiment of FIG. 3 can also determine whether the target leaves the preset scenery in an efficient and accurate manner.

In an embodiment of the invention, a non-transitory computer readable recording medium is further provided, wherein a computer program is stored. The computer program is configured to execute each step of the image analysis method above. The computer program is composed of a plurality of code snippets, and after the code snippets are loaded into the computer or processor and executed, the steps of the image analysis method above can be performed to determine whether the target enters the preset scenery or leaves the preset scenery.

Based on the above, in the image analysis method, the electronic system, and the non-transitory computer readable recording medium provided in an embodiment of the invention, a motion detection requiring less computation is first performed on an image captured by the image capture device, and only after a motion is confirmed in the image is image analysis requiring more computation performed on the image to determine whether the specific region of the image includes the target and determine whether the target enters the preset scenery or leaves the preset scenery. Accordingly, computing load can be significantly reduced and reliable and low-cost image analysis method and tool can be provided.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An image analysis method applicable to an electronic system comprising an image capture device, the image analysis method comprising:
    obtaining a plurality of images captured by the image capture device;
    performing a motion detection on the images to determine whether the images comprise a motion; and
    determining whether a target enters a preset scenery or leaves the preset scenery in response to the determination of the motion detected on the plurality of images by the motion detection,
    wherein the step of determining whether the target enters the preset scenery or leaves the preset scenery comprises:
    obtaining a follow-up image captured by the image capture device and performing an image analysis on the follow-up image to determine whether the target enters the preset scenery or leaves the preset scenery,
    wherein when the image analysis is performed on the follow-up image to determine whether the target enters the preset scenery or leaves the preset scenery, a capture time of the follow-up image is not earlier than a capture time of the images determined to comprise the motion.

2. The image analysis method of claim 1, wherein the step of determining whether the target enters the preset scenery or leaves the preset scenery comprises:
    searching for the target in a scenery region of the follow-up image to determine whether the target enters the preset scenery according to whether the scenery region comprises the target, wherein the scenery region corresponds to the preset scenery.

3. The image analysis method of claim 1, wherein after determining the images comprise the motion, the image analysis method further comprises:
    determining whether the motion enters the preset scenery.

4. The image analysis method of claim 1, wherein after determining the images comprise the motion, the image analysis method further comprises:
    deciding a first region according to the motion; and
    defining a plurality of feature points in the first region.

5. The image analysis method of claim 4, wherein the step of deciding the first region according to the motion comprises:
    obtaining a motion image of the images, wherein the motion image comprises a plurality of motion regions;
    filtering the motion regions according to an area of each motion region to keep at least one of the motion regions; and
    deciding the first region according to the at least one motion region kept.

6. The image analysis method of claim 5, wherein the step of deciding the first region according to the at least one motion region kept comprises:
    selecting a target region from the at least one motion region according to the preset scenery;
    deciding the first region according to the target region, wherein a top edge of the first region is higher than a top edge of the target region.

7. The image analysis method of claim 4, wherein the step of determining whether the target enters the preset scenery or leaves the preset scenery further comprises:
    obtaining optical flow information according to the feature points of the images; and
    deciding a motion direction according to the optical flow information.

8. The image analysis method of claim 7, wherein the step of determining whether the target enters the preset scenery or leaves the preset scenery further comprises:
    determining whether the motion direction conforms to a preset entry direction;
    if the motion direction does not conform to the preset entry direction, determining the target does not enter the preset scenery; and
    if the motion direction conforms to the preset entry direction, obtaining a follow-up image captured by the image capture device and performing an image analysis on the follow-up image to determine whether the target enters the preset scenery.

9. The image analysis method of claim 7, wherein the step of determining whether the target enters the preset scenery or leaves the preset scenery further comprises:
    determining whether the motion direction conforms to a preset exit direction;
    if the motion direction does not conform to the preset exit direction, determining the target does not leave the preset scenery; and
    if the motion direction conforms to the preset exit direction, obtaining a follow-up image captured by the image capture device and searching for the target in a scenery region of the follow-up image to determine whether the target leaves the preset scenery according to whether the scenery region comprises the target, wherein the scenery region corresponds to the preset scenery.

10. An electronic system, comprising:
an image capture device; and
a processor coupled to the image capture device and configured to:
    obtain a plurality of images captured by the image capture device;
    perform a motion detection on the images to determine whether the images comprise a motion; and
    determine whether a target enters a preset scenery or leaves the preset scenery in response to the determination of the motion detected on the plurality of images by the motion detection, wherein when determining whether the target enters the preset scenery or leaves the preset scenery, the processor is configured to:
obtain a follow-up image captured by the image capture device and perform an image analysis on the follow-up image to determine whether the target enters the preset scenery or leaves the preset scenery,
wherein when the processor performs the image analysis on the follow-up image to determine whether the target enters the preset scenery or leaves the preset scenery, a capture time of the follow-up image is not earlier than a capture time of the images determined to comprise the motion.

11. The electronic system of claim 10, wherein when determining whether the target enters the preset scenery or leaves the preset scenery, the processor is configured to:
search for the target in a scenery region of the follow-up image to determine whether the target enters the preset scenery according to whether the scenery region comprises the target, wherein the scenery region corresponds to the preset scenery.

12. The electronic system of claim 10, wherein after determining the images comprise the motion, the processor is configured to:
determine whether the motion enters the preset scenery.

13. The electronic system of claim 10, wherein after determining the images comprise the motion, the processor is configured to:
decide a first region according to the motion; and
define a plurality of feature points in the first region.

14. The electronic system of claim 13, wherein when deciding the first region according to the motion, the processor is configured to:
obtain a motion image of the images, wherein the motion image comprises a plurality of motion regions;
filter the motion regions according to an area of each motion region to keep at least one of the motion regions; and
decide the first region according to the at least one motion region kept.

15. The electronic system of claim 14, wherein when deciding the first region according to the at least one motion region kept, the processor is configured to:
select a target region from the at least one motion region according to the preset scenery;
decide the first region according to the target region, wherein a top edge of the first region is higher than a top edge of the target region.

16. The electronic system of claim 13, wherein when determining whether the target enters the preset scenery or leaves the preset scenery, the processor is configured to:
obtain optical flow information according to the feature points of the images; and
decide a motion direction according to the optical flow information.

17. The electronic system of claim 16, wherein when determining whether the target enters the preset scenery or leaves the preset scenery, the processor is configured to:
determine whether the motion direction conforms to a preset entry direction;
if the motion direction does not conform to the preset entry direction, determine the target does not enter the preset scenery; and
if the motion direction conforms to the preset entry direction, obtain a follow-up image captured by the image capture device and perform an image analysis on the follow-up image to determine whether the target enters the preset scenery.

18. The electronic system of claim 16, wherein when determining whether the target enters the preset scenery or leaves the preset scenery, the processor is configured to:
determine whether the motion direction conforms to a preset exit direction;
if the motion direction does not conform to the preset exit direction, determine the target does not leave the preset scenery; and
if the motion direction conforms to the preset exit direction, obtain a follow-up image captured by the image capture device and search for the target in a scenery region of the follow-up image to determine whether the target leaves the preset scenery according to whether the scenery region comprises the target, wherein the scenery region corresponds to the preset scenery.

19. A non-transitory computer-readable recording medium storing a code, wherein an image analysis method can be completed when the code is loaded into a computer and executed, the image analysis method comprising:
obtaining a plurality of images from an image capture device;
performing a motion detection on the images to determine whether the images comprise a motion; and
determining whether a target enters a preset scenery or leaves the preset scenery in response to the determination of the motion detected on the plurality of images by the motion detection,
wherein the step of determining whether the target enters the preset scenery or leaves the preset scenery comprises:
obtaining a follow-up image captured by the image capture device and performing an image analysis on the follow-up image to determine whether the target enters the preset scenery or leaves the preset scenery,
wherein when the image analysis is performed on the follow-up image to determine whether the target enters the preset scenery or leaves the preset scenery, a capture time of the follow-up image is not earlier than a capture time of the images determined to comprise the motion.

* * * * *